United States Patent [19]

Mermelstein

[11] 4,193,218
[45] Mar. 18, 1980

[54] TRANSLUCENT STORAGE PAGES FOR FILING FILM SLIDES

[75] Inventor: Leon Mermelstein, Rockaway, N.J.

[73] Assignee: Franklin Distributors Corporation, Morris Plains, N.J.

[21] Appl. No.: 896,139

[22] Filed: Apr. 13, 1978

[51] Int. Cl.² .............................................. G09F 1/10
[52] U.S. Cl. .................................. 40/374; 40/158 B; 312/184
[58] Field of Search ................. 40/158 R, 158 B, 159, 40/154, 152, 152.1, 374, 359, 360, 16.4, 404, 405; 312/184

[56] References Cited

U.S. PATENT DOCUMENTS

| | | | |
|---|---|---|---|
| 2,206,522 | 7/1940 | Varon | 40/16.6 |
| 2,601,026 | 6/1952 | Jones | 40/360 X |
| 2,968,882 | 1/1961 | Ozeki | 40/374 |
| 3,150,457 | 9/1964 | Thieme | 40/152 |
| 3,164,917 | 1/1965 | Harper | 40/360 |
| 3,195,258 | 7/1965 | Gwin | 40/158 R |
| 3,727,334 | 4/1973 | Sakamoto | 40/158 R |
| 3,958,348 | 5/1976 | Sakamoto | 40/158 R |

FOREIGN PATENT DOCUMENTS

| | | | |
|---|---|---|---|
| 766071 | 8/1967 | Canada | 40/360 |
| 402815 | 5/1966 | Switzerland | 312/184 |

*Primary Examiner*—John F. Pitrelli
*Assistant Examiner*—G. Lee Skillington
*Attorney, Agent, or Firm*—Martha G. Pugh

[57] ABSTRACT

Translucent plastic pages of an improved design for the filing of color film slides, wherein the storage trays are slightly indented to remove the slide emulsion from direct contact with the plastic. In accordance with a further feature, the translucent storage pages are formed from archival material, and are designed alternatively to be suspended in a file cabinet by means of a hanging bar which affixes to the page, and includes an indexing tab; or to be stored in a conventional ring binder, without the hanging bar.

5 Claims, 6 Drawing Figures

TRANSLUCENT STORAGE PAGES FOR FILING FILM SLIDES

BACKGROUND OF THE INVENTION

This invention relates in general to translucent storage pages for use in filing photographic film slides, more particularly, storage pages of the type described, having certain improvements for preserving the slide and making access to the slides more convenient.

Translucent storage pages for use in filing and preserving photographic film slides are well known in the prior art, as disclosed, for example, in U.S. Pat. No. 2,968,882 issued to Jiro Ozeki on Jan. 24, 1961. It has been found, however, that in the use of ordinary easily-formed plastic materials, such as, for example, polyvinyl chloride, which are conventionally used for this purpose, the photographic emulsion on the surface of the slides has a tendency to deteriorate because of the reactive quality of the non-archival material used, which is further aggravated by actual contact between the emulsion surface and the face of the storage page. Furthermore, although provision is made for filing the storage pages in ring binders, in such an arrangement it may be difficult to obtain access to individual slides.

BRIEF DESCRIPTION OF THE INVENTION

Accordingly, it is a principal object of the present invention to provide an improved storage page for photographic slides, which is designed in an improved manner to protect the photographic emulsion for the life of the slide. Another object of the invention is to provide storage pages which can be readily filed and indexed in a standard filing cabinet, using standard filing frames, which allow the pages to independently hang free in the cabinet.

These and other objects are attained in accordance with the present invention in an improved design, in which the storage page is fabricated from what is known as "archival material". Another feature of the design of the present invention is the fabrication of the storage page, so that each of the storage trays for storing individual slides is formed to include in the interior thereof a slight indentation or recess, about a millimeter in depth, so that the interior surface of the storage tray is removed from direct contact with the face of the photographic emulsion.

This recess functions to permit the circulation of air around the slide and to prevent the trapping of chemical vapors or moisture between the emulsion surface and the inner surface of the storage page during the storage period, thereby preventing a chemical reaction from taking place between, for example, the acids and sulphurs which are part of the paperboard or other conventional slide mounts from evaporating and attacking the emulsion.

A further feature of the improved design includes ridges which facilitate the slideable attachment of a plastic hanger bar having hooks at opposite ends, allowing the storage page to be hung along standard supporting file frames in a standard letter-size file cabinet, and indexing means.

Other objects, features and advantages of the present invention will be apparent from a study of the detailed specification hereinafter, with reference to the attached drawings.

SHORT DESCRIPTION OF THE DRAWINGS

DETAILED DESCRIPTION OF THE INVENTION

Figure 1:
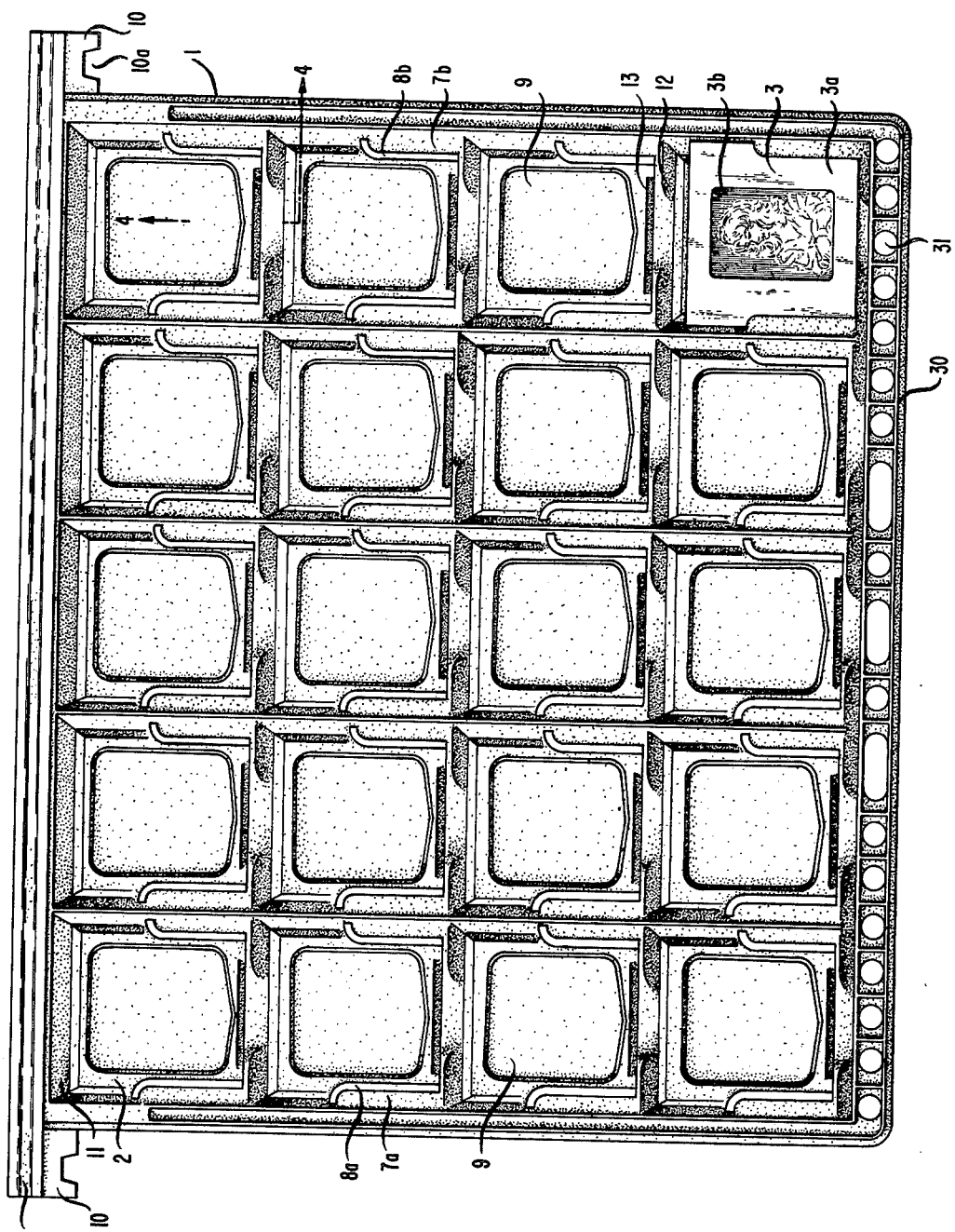
FIG. 1 shows a front view of the slide storage page of the present invention.

Referring now to FIG. 1 there is shown a slide storage page 1 which in the present illustrative example has an overall dimension of 24.13 by 28.58 centimeters, which in preferred form is made out of plastic material of archival quality by what is known in the art as a vacuum forming process. In the specifications and claims hereinafter, the term "archival material" refers to material which is not substantially chemically reactive with photographic emulsion. A preferred material for the slide storage page of the present invention is polypropylene; although it will be understood that other materials having similar characteristics relating to the preservation of the stored photographic slides can also be used. Preferably, the material is translucent, as opposed to being transparent, in order to sufficiently diffuse light rays impinging on it, without effecting what is known as a "pinhole" effect.

In the present embodiment, the slide storage page 1 comprises a number of rectangular trays 2, each one of which is adapted for the storage of a single slide, such as 3, shown in the lower right-hand corner of FIG. 1.

In the present illustrative embodiment there are twenty of the trays 2, each one of which has an overall dimension of 5.4 centimeters square, although it will be understood, of course, that the dimensions and the number of trays in each of the slide storage pages are a matter of choice.

Figure 2A:
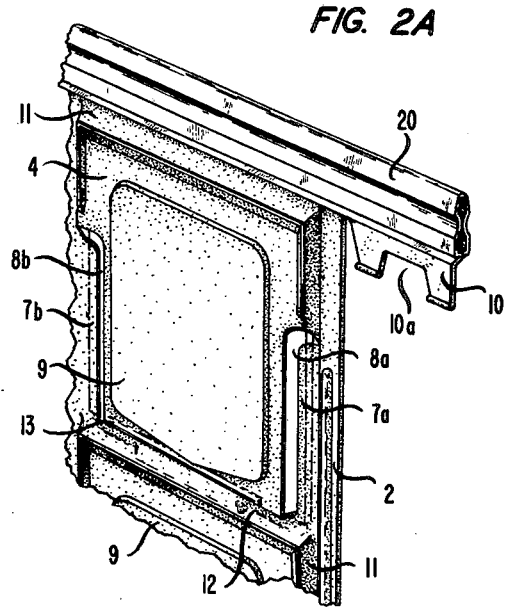
FIG. 2A is a fragmentary showing, in perspective, looking from the rear, of the upper right-hand corner of the slide storage page shown in FIG. 1, showing particularly the design of the page with hanging bar, including one of the hooks, in position for file cabinet storage of the slide pages.
Figure 3:
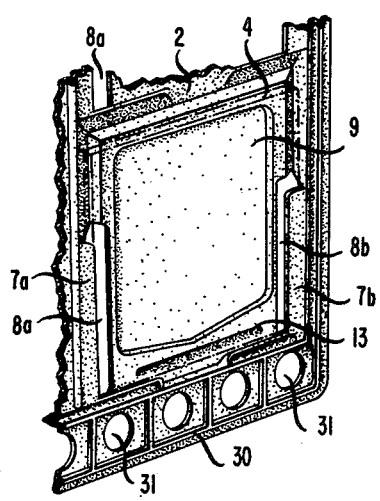
FIG. 3 is a fragmentary showing, in perspective, looking from the front of the slide storage page of FIG. 1.
Figure 4:
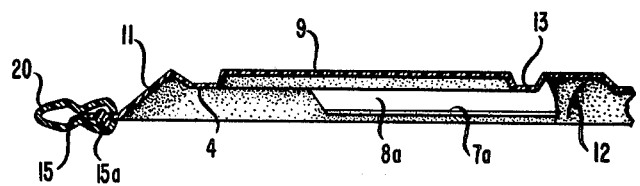
FIG. 4 is a sectional showing through the plane indicated by the arrows 4—4 of FIG. 1, as viewed from the reverse side.

Referring to FIGS. 2A, 3 and 4, which respectively show the back, front and sectional shape of a single tray, it will be seen that each of the trays 2 has an overall base portion 4 which is 50 millimeters square and which is indented 5 millimeters from the front face of the page. In each case, the area of the base surface 4 of each of the trays 2 is determined so that a slide 3 comprising a frame 3a and a central emulsion portion 3b can be inserted therein. (See FIG. 1) In each case, the slide 3 is held in place in the tray 2 by means of a pair of projecting tabs 7a, 7b on opposite sides of each of the trays. The projecting tabs 7a, 7b, which extend up about half the length of the tray are 4.2 millimeters wide and have a maximum length of about 30 millimeters long, alternate adjacent tabs being about 2 millimeters shorter, as shown in FIG. 1, to provide additional strength and easy insertion and withdrawal of the slide. Tabs 7a, 7b are formed by cutting longitudinal slots 8a, 8b out of the base surface, and pressing the cutout portion upward. The overall width of the cutout portions 8a, 8b is about 10 millimeters, and their length about 30 millimeters. The tabs 7a, 7b are formed and dimensioned to hold slide mounts of varying thicknesses; for example, cardboard mounts (1 millimeter); plastic or glass mounts, 2.5 millimeters.

In accordance with the present invention, a particular improvement comprises providing in each one of the trays 2 a central recessed portion 9. The latter is about 35 millimeters square, and is recessed to a depth of about 1 millimeter below the base surface 4. The recesses 9 are somewhat larger than the film emulsion portion 3b of the color slide 3, so that the base 4 of the tray 2 supports the color slide mount 3a while the emulsion is spaced apart from contact with the plastic surface of the tray 2. This provides space about 1.5 millimeters deep, wherein air can circulate under and around the slide and can prevent trapping of chemicals between the slide surface and the supporting tray. Chemicals which have been found to cause deterioration of the photographic emulsion of the stored slides are either those which may make up the slide itself, or which are present in the paper-board mount. These could combine with moisture to react with and effect deterioration of the emulsion 3a.

Figure 2B:
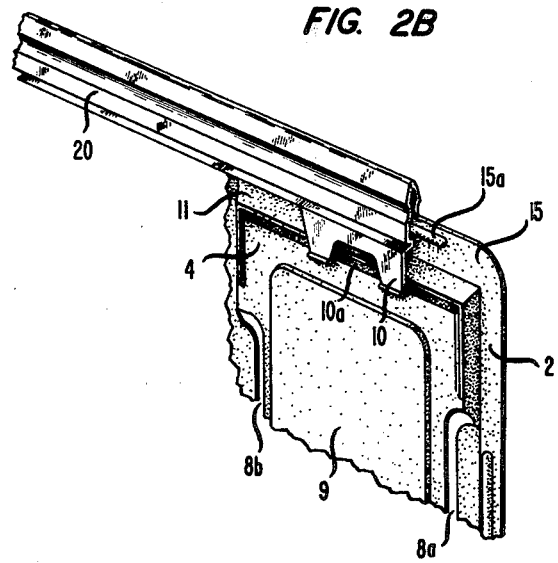
FIG. 2B is a showing, in perspective, of the fragment of FIG. 2A in which the hanging bar is partially removed from the slide page.

Referring specifically to FIG. 2A, there is shown in fragment, the upper right-hand corner of the slide storage page 1, including a hanger-bar 20. The latter, which may be, for example, 32.3 centimeters long, and 2 centimeters wide, is about 4 millimeters through the widest part. This is formed from a sheet of polystyrene about 1 millimeter thick, which is folded lengthwise, so as to provide an opening along the lower edge. The parallel opposite sides of hanger-bar 20 are impressed with matching inwardly-directed lengthwise ridges, so that the open inner edge of hanger-bar 20 is constructed to engage in slideable relation a lip 15 about 6 millimeters wide along the upper edge of the slide storage plate 1, as shown in FIG. 2B. The lip 15 has a series of aligned ridges 15a, parallel with the edge, and each about 1½ millimeters long, projecting about 1 millimeter above the surface of the lip, and which are spaced apart at intervals so that the end ridges are 2 centimeters in from the respective corners. The ridges 15a serve to secure the hanger-bar 20 in place in snap-fit relation on the edge 15.

Figure 2C:
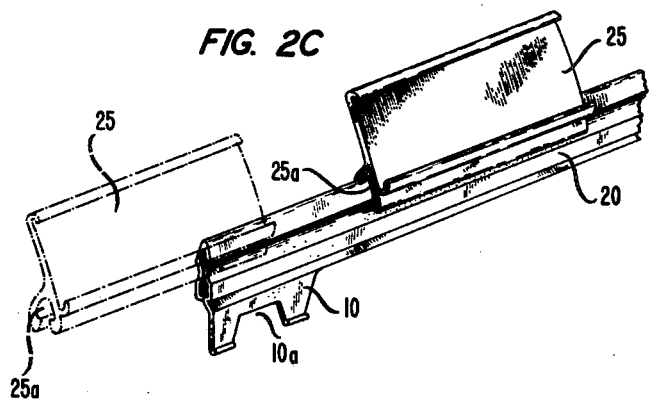
FIG. 2C, is a showing of the hanging bar of FIG. 2B, showing the indexing tab applied, and in phantom, partially removed.

A further addition to the combination is an indexing tab 25, shown in FIG. 2C, which may be, for example, about 5 centimeters long and 3 centimeters wide, the upper part comprising a flat rectangular tab, the edges of which are inwardly bent to accommodate an indexing marker. The lower edge 25a of index tab 25 comprises a pair of elongated clips which snap-fit onto the longitudinal ridge of hanger-bar 20, so that index tab 25 can be readily slid onto or off of hanger-bar 20, the different positions being shown in full line, and in phantom, in FIG. 2C.

A pair of hooks 10 project in a lateral direction from the upper-right and left-hand corners of the slide storage page as shown, for example, in FIG. 1. The lower edge of the hook 10 has an indentation 10a which is constructed to be accommodated in the guides of a conventional frame for a letter-size file cabinet, so that the slide storage pages 1, instead of being filed in ring binders in the conventional manner, may also be hung on conventional filing frames in said cabinets. This feature will allow each page to hang independently, allowing for further air circulation. Alternatively, the lower edge 30 of the slide storage page is provided with a marginal area including the openings 31 which are punched for filing in a conventional or multi-ring, binders.

It will be seen that the inner wall 11 on the upper edge of each of the trays 2, as shown in FIGS. 1 and 4, is inclined to the base surface 4 at an angle which is dependant upon variables, such as the coefficient friction of the plastic material of which the tray 2 is formed (relative to slide 3), the thickness of the material and other factors. It has been found, however, an angle of 45° to the horizontal base 4, is preferable for this purpose. The inclined wall 11 serves to facilitate easy insertion and removal of the slide 3 in such a manner as to prevent it from slipping out of the tray 2.

Referring again to FIG. 1, the wall 12 on the lower inner edge of each of trays 2 is cut off in such a manner as to form a linear depression 13 which extends about 3 centimeters along the lower wall.

It is possible to insert a finger in the depression 13 so as to enable the bottom edge of the slide 3 to be pushed forward, thereby to slip its front-end over the inclined upper wall 11 along the upper edge of the tray 2. This facilitates its removal from the tray.

When it is desired to insert the slide 3 into the tray 2, the bottom end of the slide 3, with its emulsion side down, is inserted into the space formed between the projecting tabs 7a, 7b and the base surface 4. The slide 3 is then pushed forward until the frame 3b rests on the base surface 4, thereby enclosing the slide 3 in the tray 2 without contact between the emulsion surface 3a and the inner surface of the recess 9.

It will be apparent that a large number of color film slides 3 can thus be enclosed in trays 2 of each of the slide storage pages in such a way as to be securely held in place by the inclined upper wall 11, either when stored in a conventional ring binder, or when the slide storage page is stored in a file cabinet by use of the hanger-bar 20, including hooks 10. The appropriate slide 3 is easily retrieved in a single operation, by inserting one fingertip into the slots 8a, 8b and pushing the slide 3 forward.

Slide storage pages of the form disclosed in FIG. 1, and having the constructional features described in the foregoing paragraphs, can be made by a vacuum form molding process of manufacture out of sheets of polypropylene, which in the present illustrative embodiment may have a thickness of 0.4 millimeters. The compactness of the slide storage pages enables a large number of them to be filed together in a ring binder or in a conventional letter-size file cabinet. The archival characteristics of the material, and the fact that the emulsion is held in spaced-apart relation from the plastic tray in which the slide is secured, enables the slides to be kept for many years without substantial chemical and mechanical deterioration.

It will be understood that the present invention is not limited to the particular form disclosed and described herein by way of illustration, but only by the scope of the appended claims.

What is claimed is:

1. A self-supporting unitary slide storage page for holding and viewing photographic slides, comprising a sheet of translucent plastic material of archival character;

said sheet comprising retaining means, including a number of contiguous rectangular trays which are spaced apart in a lateral and longitudinal patterned relationship;

each of said trays being adapted to hold a photographic slide, and including integral projecting tabs for holding said slide in storage position in said tray;

each said tray having a slightly recessed rectangular central base portion which is surrounded on its inner periphery with a slightly raised frame constructed for contact with the edge mounts of said photographic slides, the shape of said recessed central base portion constructed to substantially correspond in lateral extent to at least exceed the extent of the emulsion-covered portion of the said slides and to be slightly spaced apart therefrom when one of said slides is in storage position in one of said trays.

2. The combination in accordance with claim 1 wherein each said tray is surrounded by two side walls and a first and second end wall;

said projecting tabs extending from one said end wall in parallel spaced relation respectively adjacent the side walls in each of said trays, adjacent ones of said tabs being of slightly uneven lengths;

said one end wall providing retaining means for a single slide, and the other end wall being inclined toward said framed portion to facilitate insertion and removal of each said slide, and being provided with an intermediate opening to allow a fingertip to be inserted therein to remove said slide from said retaining means.

3. The combination in accordance with claim 1, wherein said material of archival character is polypropylene.

4. The combination in accordance with claim 1, which includes means for hanging said storage pages on a standard file frame in a standard file, said means comprising:

a lip along an upper-end of said slide storage page having a plurality of co-linear ridges disposed parallel to the edge of said storage page; and a hanger-bar having a longitudinal slot constructed to accommodate said lip in slidable relation and to be secured in position in snap-on relation to said co-linear ridges, and said hanger-bar including a pair of hooks which project out laterally from the ends of said hanger-bar for accommodation on said standard file frame.

5. The combination in accordance with claim 4, which includes an indexing tab; and means along the lower edge of said tab for securing said tab in slidable relation to the upper edge of said hanger-bar.

* * * * *